Patented June 9, 1953

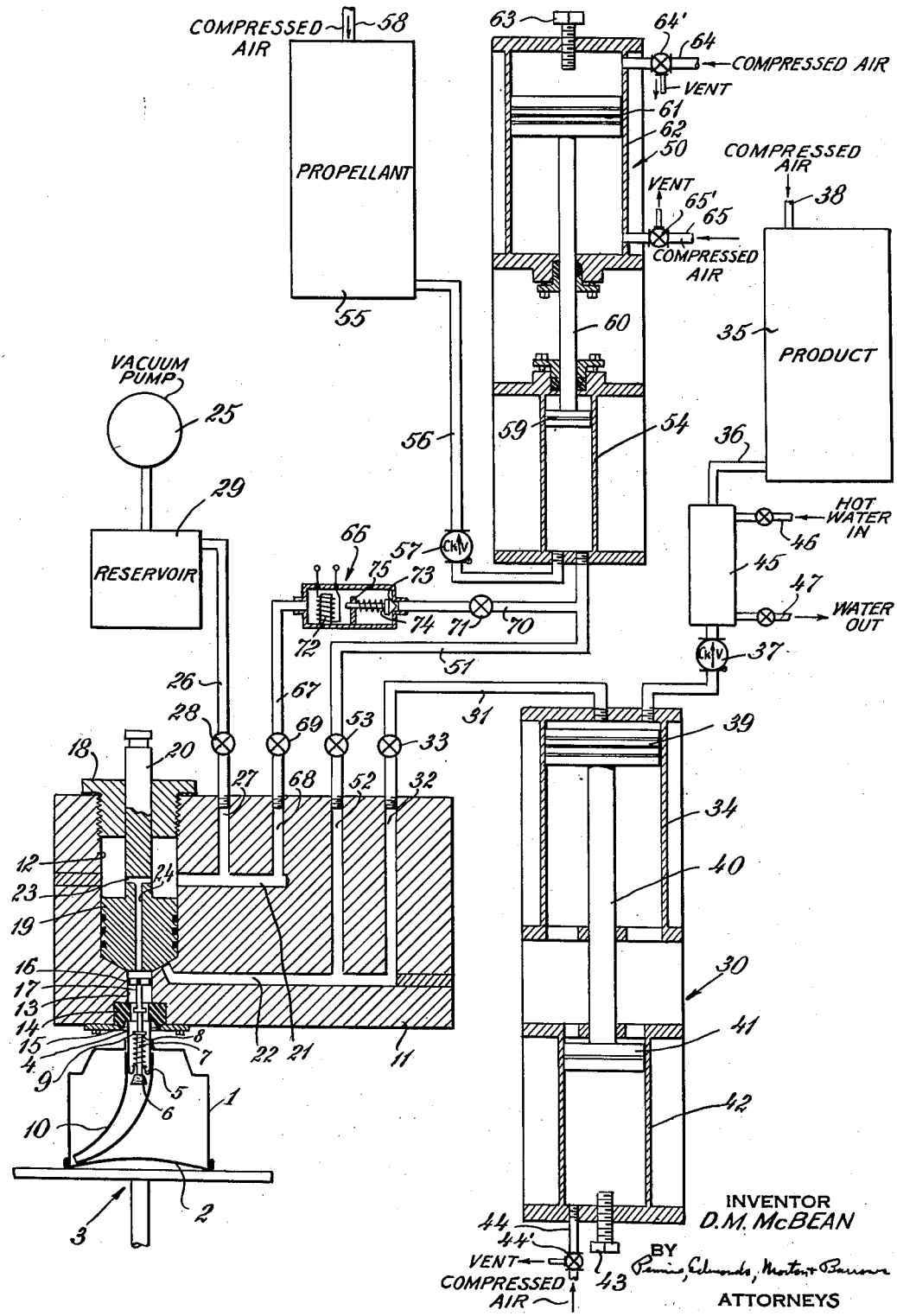

2,641,399

UNITED STATES PATENT OFFICE 2,641,399

METHOD FOR CHARGING LIQUID PRODUCTS AND VOLATILE PROPELLANTS INTO PRESSURE CONTAINERS

Douglas M. McBean, Rochester, N. Y., assignor, by mesne assignments, to Carter Products, Inc., New York, N. Y., a corporation of Maryland Application December 8, 1949, Serial No. 131,802

8 Claims. (Cl. 226—100)

This invention relates to the filling of fluids, including volatile propellants and liquid products to be propelled, into pressure-tight containers. More particularly the invention is concerned with such filling of pressure-tight containers when the liquid product to be filled into the containers is an aqueous liquid product. It also constitutes an improvement over the method of filling disclosed in co-pending application Ser. No. 131,801 of Leo J. DeCosta and myself, filed December 8, 1949.

As set forth in the co-pending application, it has heretofore been customary in the packaging of materials, including volatile propellants, in pressure-tight containers to fill and close the container at atmospheric pressure keeping the temperature of the material to be packaged below a temperature at which the vapor pressure of the propellant is greater than the prevailing atmospheric pressure. By a volatile propellant I means a compound having a vapor pressure appreciably above atmospheric pressure at normal room temperature. When the product to be packaged comprises or includes water or an aqueous solution or suspension, filling at low temperature is unsatisfactory because the temperature required to maintain the useful propellants in liquid phase at atmospheric pressure is below the freezing temperature of the product or the water or aqueous solution therein. Thus, in filling at temperatures low enough to keep the useful propellants in liquid phase the product freezes and the mixing of the product and the propellant is prevented. The container must therefore be subsequently heated and agitated in order that a proper mixing of the product and propellant be accomplished. This procedure is unsatisfactory both because of the time involved in accomplishing mixing by heating and agitating the container and because of the fact that, despite the heating and agitation, a satisfactory mixing is not uniformly accomplished. In addition, the refrigeration and heating plants required for freezing and subsequent mixing, respectively, involve considerable expense.

Another difficulty involved in the above method of filling containers by freezing the product therein is that of inserting a siphon tube and valve, with which the pressure-tight containers must be provided, in the container while the liquid product therein is frozen. In order to do so it is necessary to freeze the liquid in the container in a very definite tilted position so that the siphon tube may be properly located. If the container is filled with the maximum quantity of liquid product, it is almost impossible to insert the tube while the material is in frozen condition.

While the method disclosed by the co-pending application accomplishes the charging of aqueous liquid products and volatile propellants into pressure-tight containers without resorting to refrigeration and without resorting to the procedure set forth above for mixing the contents of the filled container subsequent to the filling operation, it does not accomplish such charging as rapidly as is desirable because it contemplates the introduction into a container of the liquid product prior to and separate from the introduction thereinto of the volatile propellant.

It is the object of the present invention to provide an improved method for charging an aqueous liquid product and a volatile propellant into a pressure-tight container at considerably greater speed than does the method of the co-pending application and without resorting to the undesirable features of the freezing method set forth above. The improved method primarily involves the concurrent introduction of the liquid product and the volatile propellant into the pressure-tight container. In general it comprises the steps of introducing a measured charge of liquid product into the container through a valve controlled opening therein, and during the introduction of the liquid product, that is after the beginning and before the end of the introduction of the liquid product, introducing a measured charge of propellant in liquid phase into the container through the same valve controlled opening. It also includes, when desirable, either or both of the steps of heating the liquid product prior to its introduction and superheating a portion of the measured charge of propellant to gaseous phase and introducing it into the container after the completion of the introduction of the liquid product and the propellant in liquid phase.

For a more detailed description of my invention reference may be made to the accompanying drawing in which the single figure diagrammatically sets forth, in elevation and partly in section, one type of apparatus by which the method may be accomplished.

In the drawings a typical packaging and pressure-tight container is illustrated in section as having a body portion 1 and a suitably attached concave bottom wall 2. The container is supported on the platform of a hydraulic lift 3 for movement into and out of filling position. An outlet valve is suitably secured in an opening in the top wall of the container by a pressure-tight seal or connection. The valve shown comprises a tube 4 having an inturned flange 5 at its inner end which forms a valve seat. A valve plug 6 carried by a valve stem 7 is resiliently held in engagement with the valve seat 5 by a spring 8 which is compressed between the flange 5 and a stop 9 struck from the stem 7. A siphon tube 10 of suitable material is fitted over the lower end of tube 4 within the can and extends to a point near the juncture of the side and bottom walls 1 and 2 of the container. Such a positioning of the lower end of tube 10 assures expulsion of substantially all of the contents of the filled can when it is used.

A valve block 11 is positioned above the hydraulic lift 3 and has a valve chamber 12 formed in it, the valve chamber being in communication with the lower surface of the block by means of a passageway 13. A gasket 14 is supported in the lower end of passageway 13 and has a bevelled recess 15 in its lower face surrounding and concentric with its central opening to receive the upper edge of tube 4 of the container in a pressure-tight seal. A spider 16 is mounted in the passageway 13 above the gasket and supports a valve actuating member 17 which is adapted to abut the valve stem 7 of the can or container when tube 4 is seated in recess 15 of the gasket. The upper end of valve chamber 12 is closed by a plug 18. A piston type valve 19 is located in the chamber 12 and has its stem 20 extending in seal tight relation through a central bore in plug 18. This valve is adapted to place, alternately, in communication with the valve chamber 12, passageways 21 and 22 of the valve block, which are respectively the passageways for withdrawing air from the can and for introducing the liquid product and the propellant to the can. When valve 19 is in its lower position, passageway 22 is closed off from valve chamber 12. Passageway 21 is, in this position of the valve, in communication with the chamber 12 and in communication with passageway 13 leading to the can by means of a transverse bore 23 in valve stem 20 and a longitudinal bore 24 connected therewith and extending through the valve body. When the valve is in its upper position, passageway 21 is sealed off and passageway 22 is placed in communication with the valve chamber and the can through passageway 13. Valve 19 may be raised and lowered by hand or by any other suitable means.

A vacuum pump 25 is provided for evacuating the can or container and is connected to the evacuating passageway 21 of the valve block through conduit 26 and a passageway 27 leading from passageway 21 to the face of the block. A manually operable valve 28 is placed in conduit 26 adjacent its connection to the valve block to close off the conduit, as will be described subsequently. A reservoir tank and separator 29 is also placed along conduit 26 between the vacuum pump and the manual valve. The reservoir tank and separator may be provided with means whereby the degree to which the packaging container is evacuated may be measured and controlled, or such means may be provided somewhere else in the evacuating system. This is desirable in order that each can filled by the apparatus being described be first of all evacuated to a predetermined degree, which is important if the cans are to be uniformly filled and are to have uniform quantities of liquid products and volatile propellants contained therein. The separator feature of the reservoir tank and separator 29 is desirable because a certain amount of liquid product and possibly volatile propellant from the filling operation of a previously filled can may be withdrawn into the evacuating conduit when the next can to be filled is evacuated.

The aqueous liquid product is supplied to passageway 22 of the valve block, from a metering device 30 through a conduit 31 and a passageway 32 extending from passageway 22 to the face of the block. A valve 33 is positioned in the conduit 31 adjacent the face of the block where the conduit is connected to passageway 32. The metering device 30 comprises an upper cylinder 34 adapted to receive a measured charge of the liquid product. It is to the upper end of this cylinder that conduit 31 is connected for carrying the liquid product from the cylinder to the valve block. The liquid product is supplied to the same end of cylinder 34 from a supply tank 35 through a conduit 36, having a check valve 37 therein. Compressed air may be supplied to tank 35 through a conduit 38 to positively force liquid product from the tank to cylinder 34 of the metering device. A piston 39 is reciprocably mounted within cylinder 34 on a piston rod 40. The piston rod 40 supports at its other end a piston 41, which is reciprocable in a lower cylinder 42 of the metering device. Cylinder 42 is adapted to receive compressed air which acts on piston 41 and through piston rod 40 to urge piston 39 upwardly in upper cylinder 34. An adjusting screw 43 is located at the bottom end of cylinder 42, and by means of it, the amount of liquid product that can be received in the upper cylinder 34 may be varied. This is so because it is the degree of retraction of piston 39 in cylinder 34 that determines the amount of liquid product that can be received by the cylinder, and retraction of piston 39 is in turn controlled by the distance piston 41 may be displaced downwardly in cylinder 42. Conduit 44 is provided for supplying compressed air to cylinder 42 below piston 41 and for venting the cylinder subsequent to the operation of the metering device under control of a three-way valve 44'. Metering device 30 is operable as follows: Valve 33 is closed, and air cylinder 42 is vented through valve 44'. This permits liquid product to flow from container 35 through conduit 36 and check valve 37 to cylinder 34, the product being forced out of container 35 by air supplied to the container through conduit 38, and the pistons 39 and 41 descending under the pressure of the incoming product until piston 41 abuts adjustable screw 43. The piston 39 is thus permitted to descend a predetermined distance under the pressure of the incoming liquid product and a measured charge only of liquid product is admitted to cylinder 34. Valve 33 is then opened and compressed air is supplied to cylinder 42 through conduit 44 and valve 44', forcing piston 41 upwardly in the cylinder. This in turn forces piston 39 upwardly in cylinder 34 closing check valve 37 and expelling the measured charge of liquid product in cylinder 34 through conduit 31, passageways 32 and 22 and on into the can.

A heat exchanger 45 may be provided along conduit 36 for heating the liquid product before it is admitted to measuring cylinder 34. The heat exchanger is supplied with hot water through conduit 46, the water being removed from it through conduit 47. Each of conduits 46 and 47 is provided with a manually operable valve, so that the heat exchanger may be used or not used, depending upon the desirability of heating or not heating the liquid product.

The metering device 50 is provided for supplying a measured charge of propellant, in liquid phase, to the can through valve block 11 and is connected to passageway 22 of the valve block by conduit 51 and passageway 52 extending from passageway 22 to the face of the block. A valve 53 is placed in conduit 51 adjacent the face of the block where conduit 51 is connected to passageway 52. The metering device 50 comprises a lower cylinder 54, adapted to receive a measured charge of propellant in liquid phase from a propellant supply tank 55 through a conduit 56 in which there is a check valve 57. As the volatile propellant is maintained in liquid phase in supply tank 55, it is always subject to its own vapor pressure at the prevailing temperature. The vapor pressure of one type of propellant, the use of which is contemplated, is about 40 p. s. i. gauge at room temperature, that is at 70 to 72° F. Though this pressure would itself be sufficient to force the propellant out of the supply tank, compressed air is desirably supplied to the tank through a conduit 58 to facilitate and accelerate the removal of propellant therefrom and to force it through conduit 56 to the cylinder 54. A piston 59 is reciprocably mounted in cylinder 54 and is carried on one end of a piston rod 60 on the other end of which there is a piston 61 reciprocably mounted in an upper cylinder 62 of the metering device 50. An adjusting screw 63, similar to adjusting screw 43 of metering device 30 and for the same purpose, is mounted in the upper end of cylinder 62. This adjusting screw may be used to vary the limit of upward movement of piston 61 in cylinder 62 and therefore the limit of upward movement of piston 59 in cylinder 54. Thus the size of the charge of propellant in liquid phase admitted to cylinder 54 may be varied and accurately measured. The cylinder 62 is provided with compressed air through a conduit 64 under control of a three-way valve 64' whereby, upon the admission of compressed air to the cylinder, piston 61 may be forced downwardly therein. Because of the fact that a fairly tight packing must be used in the opening in cylinder 54, through which piston rod 60 extends, in order that none of the propellant, which is highly volatile, may escape from the cylinder, the movement of the piston rod is very stiff and the pressure of the propellant supplied to the cylinder through conduit 56 is not always sufficient to move piston 61 upwardly. Consequently, a conduit 65 is provided to supply compressed air to cylinder 62 beneath piston 61 under control of a three-way valve 65'. The pressure of the compressed air supplied by this conduit 65 is considerably less than the pressure supplied to the cylinder by conduit 64 and, in fact, is only great enough to supply the necessary force for the movement upwardly of pistons 61 and 59 when propellant is being forced into cylinder 54. Both of the compressed air conduits 64 and 65 also serve an appropriate times as vents for cylinder 62 on either side of piston 61.

The operation of the metering device 50 is as follows: Valve 53 is closed, the upper portion of cylinder 62 is vented through valve 64', and compressed air at appropriate pressure is upplied to the lower portion of cylinder 62 through conduit 65 and valve 65'. The propellant in liquid phase is thereby permitted to enter cylinder 54 from supply tank 55 through conduit 56 and check valve 57 under its own vapor pressure and the pressure of the compressed air provided to the supply tank by condiut 58. Pistons 61 and 59 move upwardly under the pressure of the incoming propellant and under the pressure of the compressed air admitted through conduit 65 until piston 61 abuts adjusting screw 63. At this point cylinder 54 is filled with propellant, the amount of propellant being determined by the limiting position of piston 59, which is in turn determined by the setting of adjustment screw 63. Valve 53 is then opened, the lower portion of cylinder 62 is vented through valve 65' and compressed air is supplied to cylinder 62 above piston 61 through conduit 64 and valve 64'. The compressed air forces piston 61 downwardly in the cylinder 62 and piston 59 downwardly in cylinder 54, thereby causing the measured charge of propellant in liquid phase in cylinder 54 to be expelled therefrom through conduit 51, valve 53, passageways 52 and 22 and into the packaging container.

It is contemplated that the compressed air supplied to conduit 44 of metering device 30 and conduit 64 of metering device 50 will be supplied from the same source and therefore at the same pressure. From the drawing it can be seen that the pressures at which the liquid product and the propellant in liquid phase are respectively introduced into the can or container are different. This is understandable because it will be noted that cylinder 42 of metering device 30 is of a somewhat smaller diameter than the product-receiving cylinder 34 thereof. Thus the pressure at which the product will be expelled from cylinder 34 will be less than the pressure at which compressed air is admitted to cylinder 42. In metering device 50, however, cylinder 62, which is the compressed air cylinder, is of considerably greater diameter than the propellant-receiving cylinder 54. Therefore, the pressure at which the propellant will be expelled from cylinder 54 will be greater than the pressure of the compressed air supplied to cylinder 62. It has been found from experience that a pressure of around 100–200 p. s. i. gauge will be satisfactory for the introduction of the liquid product, while one of around 200–400 p. s. i. gauge is desirable for the introduction of the propellant in liquid phase.

The method of my invention, as carried out by the above described apparatus, is as follows: A can or packaging container is placed on hydraulic lift 3 and moved thereby upwardly until its valve-enclosing tube 4 engages gasket 14. The depending valve actuating member 17, carried by the valve block, abuts the valve stem 7 of the can, thereby opening the valve thereof. Valve 19 is urged downwardly to its lower position in valve chamber 12, thereby sealing off passageway 22 from the valve chamber. Valve 28 is opened and the can is evacuated through the lower extension 13 of valve chamber 12, bores 24 and 23 in the valve and valve stem, respectively, passageway 21, which is in communication with the valve chamber 12 above the valve 19, passageway 27, and conduit 26. When the can has been evacuated to a predetermined degree, for instance 1" of mercury absolute, valve 28 is closed. The valve 19 is then moved upwardly in chamber 12 until it seals off passageway 21. Passageway 22 is thereby placed in communication with the lower portion of valve chamber 12 below valve 19. Valve 33 of the liquid product supply system is now opened and the metering device 30 is operated to supply a measured charge of liquid product, as described above in connection with the description of this metering device. After the supply of liquid product to the can has begun, and ideally when the pressure in the can has risen to about 22" of mercury absolute due to the inflow of product or when about half of the charge of liquid product has entered the can, valve 53 of the propellant supply system is opened and metering device 50 is operated as set forth above. In view of the fact that the amount of liquid product that is to be supplied to the can is at least several times as great as the amount of volatile propellant to be supplied thereto, the time which it takes for the operation of metering device 50 is considerably less than that for metering device 30. Thus, even though the introduction of propellant in liquid phase to the can is started after the start of introduction of the liquid product thereto, the completion of the introduction of the propellant may be accomplished prior to the completion of the introduction of the liquid product and is desirably so accomplished. When the operation of the metering device 50 is completed (which will be prior to the completion of the operation of the metering device 30, as stated) valve 53 is closed while the operation of metering device 30 continues. Upon completion of the operation of metering device 30, valve 33 is closed and the can is lowered from the valve block, the valve of the can closing automatically under the pressure of the mixture of product and propellant that have been forced into it.

If desirable, additional steps may be added to the method, as set forth above. One of these steps is the heating of the liquid product by heat exchanger 45, as above described, before the admission of such liquid product into cylinder 34 of the metering device 30. By so heating the liquid product, the mixture of liquid product and volatile propellant established in passageway 22 is heated above the prevailing temperature, thereby increasing the pressure of the propellant in liquid phase in the mixture and causing more thorough mixing and a greater rapidity in the flow of the mixture to the can. The same holds true for the mixture when it arrives in the can, that is, its temperature is above the prevailing temperature, the pressure of the propellant is greater and therefore the propellant is more thoroughly mixed with the liquid product. Assuming that the prevailing temperature at which the filling operation takes place is room temperature, that is about 70–72° F., a satisfactory temperature to which the liquid product may be heated by the heat exchanger is approximately 90° F.

Another step comprises the introduction of superheated gaseous propellant into the can subsequent to the completion of the liquid product filling operation. This is accomplished by a gas generator 66 connected to passageway 21 of the valve block through a conduit 67 and a passageway 68 leading from passageway 21 to the face of the block. A valve 69 is provided in conduit 67 adjacent the face of the valve block where the conduit is connected to passageway 68. The gas generator is supplied with a portion of the measured charge of propellant in liquid phase through a conduit 70 provided with a valve 71 and connected to conduit 51. A heating element 72 is contained in the gas generator and is maintained at a temperature considerably above the temperature at which the main filling apparatus is operated. The main filling apparatus is operated, as a general rule, at prevailing or room temperature and, in this case, the heating element is maintained at a temperature of about 250° F. A check valve 73 is also contained in the gas generator and is normally maintained closed by a spring 74 supported between it and any suitable supporting post 75. However, when valve 71 is opened and propellant in liquid phase is being expelled from cylinder 54 of metering device 50 through conduit 51, the pressure of propellant being expelled is sufficient to open check valve 73 against spring 74. This serves to admit propellant in liquid phase to the generator which, when it comes in contact with heating element 72, will be immediately vaporized to build up a high gas pressure in the generator. The high gas pressure thus built up closes check valve 73, thereby preventing the admission of any more propellant in liquid phase to the generator. In this way a limited part of the measured charge of propellant in liquid phase may be taken from conduit 51 during the operation of the propellant metering device 50. The superheated propellant in gaseous phase, thus generated by the gas generator, may be retained in the generator and in conduit 67 until valve 69 is opened. This apparatus permits the following additional step to be added to the method of this invention, as set forth above. As before stated, after metering device 30 has been operated to force the measured charge of liquid product into the can, valve 33 is closed. Valve 19 is then moved downwardly to seal off passageway 22, at the same time again placing passageway 21 in communication with the valve chamber 12. Valve 69 is now opened and the superheated gaseous propellant is admitted to the valve chamber and flows through the valve downwardly into the can, clearing the valve of the can of any of the liquid product remaining therein and also clearing the upper end of siphon tube 10 of any of the unmixed liquid product remaining therein. This assures a more complete mixture of product and propellant and prevents the initial shot of material from the can, when it is subsequently used, from being unmixed liquid product. The primary advantage of using this final charge of propellant in superheated gaseous phase rather than merely propellant in saturated gaseous phase is that while the latter might condense in passing through the valve block of the filling apparatus or in the valve of the can, thereby having a detrimental effect, the former, because of the heat contained thereby, will not cool sufficiently to condense at least until it reaches the interior of the can.

By the method of my invention, as described above, pressure-tight containers may be rapidly filled to uniform pressures with uniform quantities of thoroughly and intimately mixed liquid products and volatile propellants. Some of the liquid products and volatile propellants, with which it is contemplated to fill pressure-tight containers by this method, are disclosed in co-pending application Serial No. 125,032, filed on November 2, 1949. Apparatus similar to that here disclosed but not claimed is more specifically disclosed and is claimed in my co-pending application Serial No. 147,588, filed March 4th, 1950.

I claim:

1. The method of charging a liquid product and a volatile propellant into a pressure packaging container having a valve controlled opening, which comprises the steps of partially evacuating the container, introducing a measured charge of liquid product into the container through the valve controlled opening, and during the introduction of the liquid product and before the end of such introduction introducing a measured charge of propellant in liquid phase into the container through said valve controlled opening.

2. The method of charging a liquid product and a volatile propellant into a pressure packaging container having a valve controlled opening, which comprises the steps of partially evacuating the container, introducing under pressure a measured charge of the liquid product into the container through the valve controlled opening, and after the beginning and before the end of the introduction of the liquid product introducing a measured charge of propellant in liquid phase into the container through said valve controlled opening at a pressure greater than the pressure at which the liquid product is introduced.

3. The method of charging a liquid product and a volatile propellant into a pressure packaging container having a valve controlled opening, which comprises the steps of partially evacuating the container, introducing under pressure in a stream a measured charge of the liquid product into the container through the valve controlled opening, and after the beginning and before the end of the introduction of the liquid product introducing a measured charge of propellant in liquid phase into said stream of liquid product at a pressure greater than the pressure of the liquid product of said stream.

4. The method of charging a liquid product and a volatile propellant into a pressure packaging container in accordance with claim 1 in which the liquid product is at a temperature substantially greater than the prevailing temperature.

5. The method of charging a liquid product and a volatile propellant into a pressure packaging container having a valve controlled opening, which comprises the steps of evacuating the container to a predetermined pressure below atmospheric pressure at the prevailing temperature, introducing under pressure a measured charge of the liquid product into the container through the valve controlled opening, and introducing a measured charge of the volatile propellant in liquid phase into the container through the valve controlled opening at a pressure greater than the pressure of introduction of the liquid product and after the beginning and before the end of the introduction of the liquid product.

6. The method of charging a liquid product and a volatile propellant into a pressure packaging container having a valve controlled opening, which comprises the steps of partially evacuating the container, introducing a measured charge of the liquid product into the container through the valve controlled opening, introducing a measured charge of propellant in liquid phase into the container through said valve controlled opening after the beginning and before the end of the introduction of the liquid product, and after the completion of the introduction of the liquid product introducing superheated gaseous propellant into the container through said valve controlled opening to free said valve controlled opening of any residual liquid product.

7. The method of charging a liquid product to be propelled and a volatile propellant into a pressure packaging container of the type having a valve controlled opening and a siphon tube leading from such opening to the bottom of the container, which comprises the successive steps of partially evacuating the container, introducing in a stream through the valve opening of the container a measured quantity of the liquid product, forcing a measured quantity of liquified volatile propellant into the stream of the liquid product after the beginning and before the end of the introduction of the liquid product, and after completing the introduction of the liquid product and liquified volatile propellant introducing superheated gaseous propellant to free the control valve and siphon tube of the container of any unmixed liquid product.

8. The method of charging a liquid product and a volatile propellant into a pressure packaging container having a valve controlled opening, which comprises the steps of partially evacuating the container, introducing under pressure in a stream a measured charge of the liquid product into the container through the valve controlled opening, and introducing a measured charge of the volatile propellant into the container through the valve controlled opening, a major portion of the volatile propellant being introduced into the container in liquid phase by being introduced into the stream of the liquid product after the beginning and before the end of the introduction of the liquid product and at a pressure greater than the pressure of the liquid product, the remainder of the measured charge of volatile propellant being introduced into the container in superheated gaseous phase after completion of the introduction of the liquid product and at a pressure greater than the pressure of the propellant in liquid phase.

DOUGLAS M. McBEAN.

References Cited in the file of this patent

UNITED STATES PATENTS

| Number | Name | Date |
|---|---|---|
| 301,598 | Hunt | July 8, 1884 |
| 687,253 | Morgan | Nov. 26, 1901 |
| 1,336,071 | Dannelley | Apr. 6, 1920 |
| 2,462,642 | Jacobson et al. | Feb. 22, 1949 |
| 2,505,799 | Smith | May 2, 1950 |
| 2,505,800 | Smith | May 2, 1950 |